US008904557B2

(12) United States Patent  (10) Patent No.: US 8,904,557 B2
Radkowski et al.  (45) Date of Patent: Dec. 2, 2014

(54) SOLUTION FOR CONTINUOUS CONTROL AND PROTECTION OF ENTERPRISE DATA BASED ON AUTHORIZATION PROJECTION

(75) Inventors: John C. Radkowski, Los Altos Hills, CA (US); Swetta Singh, Saratoga, CA (US)

(73) Assignee: SAP AG, Walldorf (DE)

( * ) Notice: Subject to any disclaimer, the term of this patent is extended or adjusted under 35 U.S.C. 154(b) by 338 days.

(21) Appl. No.: 13/397,336

(22) Filed: Feb. 15, 2012

(65) Prior Publication Data

US 2013/0212711 A1 Aug. 15, 2013

(51) Int. Cl.
G06F 7/04 (2006.01)
G06F 21/24 (2006.01)
G06F 21/60 (2013.01)
G06F 21/62 (2013.01)

(52) U.S. Cl.
CPC .......... *G06F 21/6236* (2013.01); *G06F 21/604* (2013.01)
USPC .................. 726/30; 726/26; 726/27; 709/232

(58) Field of Classification Search
None
See application file for complete search history.

(56) References Cited

U.S. PATENT DOCUMENTS

| | | | | |
|---|---|---|---|---|
| 6,112,304 | A * | 8/2000 | Clawson | 713/156 |
| 6,353,878 | B1 * | 3/2002 | Dunham | 711/162 |
| 7,421,740 | B2 * | 9/2008 | Fey et al. | 726/28 |
| RE41,168 | E * | 3/2010 | Shannon | 709/229 |
| 7,739,379 | B1 * | 6/2010 | Vahalia et al. | 709/225 |
| 2003/0105734 | A1 * | 6/2003 | Hitchen et al. | 707/1 |
| 2003/0151493 | A1 * | 8/2003 | Straumann et al. | 340/5.25 |
| 2004/0255147 | A1 * | 12/2004 | Peled et al. | 713/200 |
| 2007/0061836 | A1 * | 3/2007 | Kim et al. | 725/31 |
| 2007/0179990 | A1 * | 8/2007 | Zimran et al. | 707/201 |
| 2008/0098217 | A1 * | 4/2008 | Pletka et al. | 713/165 |
| 2008/0208926 | A1 * | 8/2008 | Smoot et al. | 707/203 |
| 2009/0089862 | A1 * | 4/2009 | Sun | 726/4 |
| 2009/0164776 | A1 * | 6/2009 | Tuoriniemi | 713/158 |
| 2010/0185871 | A1 * | 7/2010 | Scherrer et al. | 713/186 |
| 2010/0332820 | A1 * | 12/2010 | Matsushima et al. | 713/150 |

* cited by examiner

*Primary Examiner* — Gilberto Barron, Jr.
*Assistant Examiner* — Abdulhakim Nobahar
(74) *Attorney, Agent, or Firm* — Fountainhead Law Group PC

(57) ABSTRACT

Extracting data from a source system includes generating an authorization model of the data protection controls applied to the extracted data by the source system. The authorization model is used to map the data protection control applied to the extracted data to generate corresponding data protection controls provided in target system. The extracted data is imported to the target system including implementing the corresponding data protection controls.

20 Claims, 4 Drawing Sheets

SOLUTION FOR CONTINUOUS CONTROL AND PROTECTION OF ENTERPRISE DATA BASED ON AUTHORIZATION PROJECTION

BACKGROUND

Unless otherwise indicated herein, the approaches described in this section are not prior art to the claims in this application and are not admitted to be prior art by inclusion in this section.

Organizations have evolved sophisticated data protection and internal controls to ensure that appropriate users have access to enterprise data. Typically, the types and capabilities of these "authorization" controls are specific to a given business application and are not applicable once data has been exported and imported into other systems such as, for example, reporting systems, analytics engines, alternate delivery channels (e.g., mobile devices), and so on. Authorization controls, are understood to refer to security policies, security controls, access policies, access controls, and so on. Replicating existing authorization controls between systems can be a challenge, since the authorization capabilities of the source system may be expressed differently in the target system or may not exist at all. This issue may affect the deployment of new applications designed to leverage existing enterprise data, since a manual and complex exercise is often required to ensure that appropriate authorization controls are projected and replicated for enterprise data that is exported from the business application and imported to the new application.

With the emerging range of new applications and new technologies, such as mobile devices, mobile applications, cloud computing, in-memory processing (e.g., SAP HANA® in-memory systems), virtual computing, and so on, replicating existing controls and protecting data has become increasingly complex and inexact. In order to maintain the same controls, organizations must complete a detailed manual assessment and replication of the existing authorization controls to ensure the same level of access when data is enabled, for example, for reporting in an SAP HANA® system or access via a mobile application. This is often inexact or impractical as the authorization capabilities are different between each application. Many organizations see this issue as a fundamental limitation when considering deployment of new applications and delivery channels.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
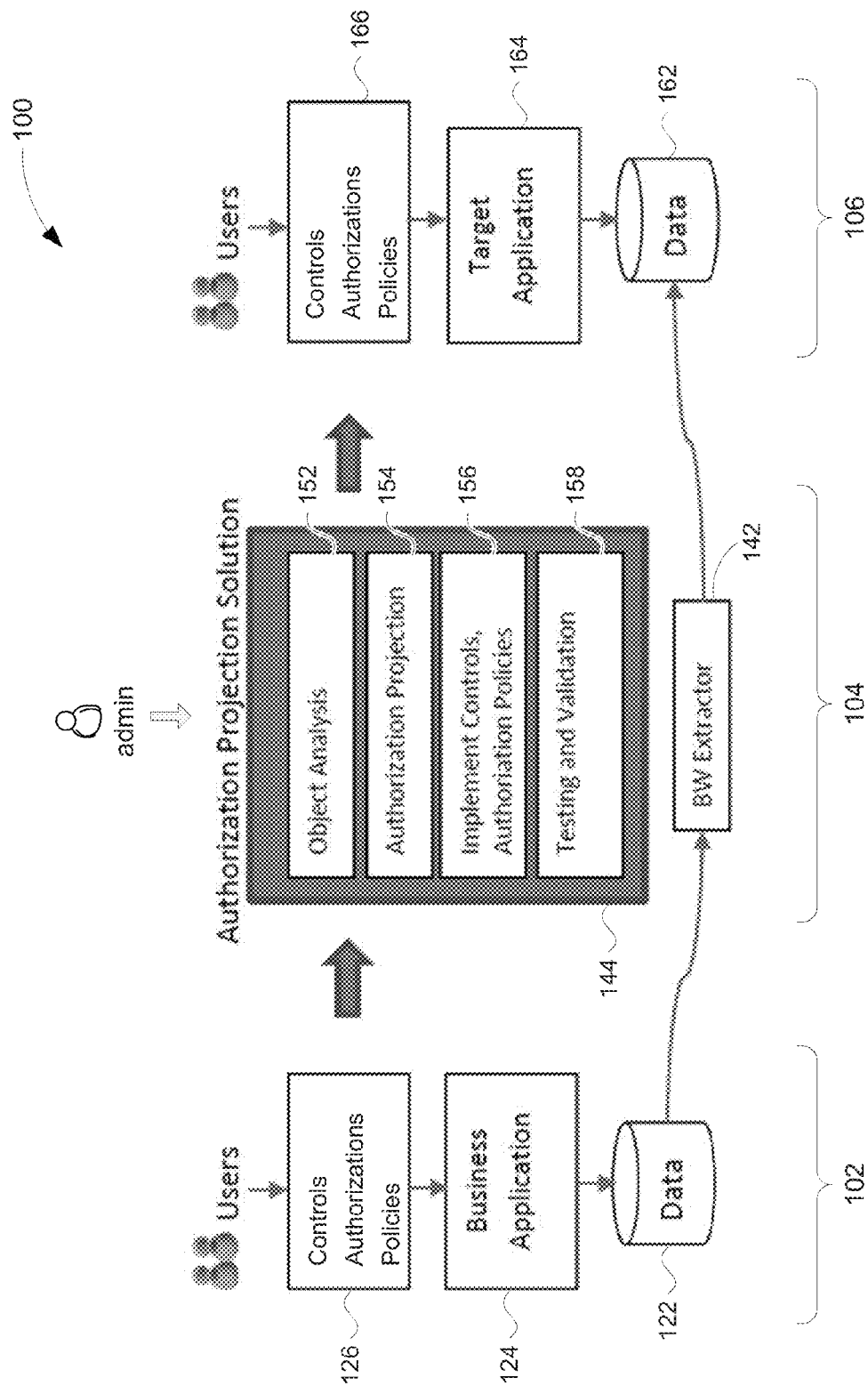
FIG. 1 is a generalized block diagram of an embodiment in accordance with the present disclosure.

Referring to FIG. 1, a system 100 having authorization projection in accordance with embodiments of the present disclosure includes a source system 102 and a target system 106. In embodiments, a data transport system 104 may communicate with the source system 102 to export or otherwise receive data from the source system and import or otherwise store the data into target system 106. In some embodiments, the data transport system 104 is a computer system that is separate from the source system. In other embodiments, the data transport system 104 may be a component of the source system 102. Communication among the source system 102, the data transport system 104, and the target system 106, may be over a suitable communication network including the Internet, a local area network, a wide area network, combinations of such networks, and so on, depending on the particular configuration.

The source system 102 may include data 122 that is generated and managed by an application 124 executing on the system. For example, in a business enterprise, the application 124 may be a business application such as an enterprise resource planning (ERP) system. The data 122 that is generated and managed by the application 124 may be protected in accordance with controls, application logic, rules, authorizations, authentication, and policies (collectively referred to as "data protection controls") 126 implemented by or otherwise specific to the application. The data 122 may include application data, master data, and in general any data that may be produced by the processing logic of the application 124. The target system 106, likewise, may include data 162 that is generated and managed by an application 164 executing on the system. The data 162 may be protected in accordance with data protection controls 166 implemented by or otherwise specific to the application 162.

Merely for illustrative purposes, examples of data protection controls (e.g., 126) include limiting data access (e.g., 122) to the set of users who are authorized to access the data via the associated application (e.g., 124). Users may be limited in terms of the range of values that they can assign to data; for example, a bank teller may be limited in how much they may adjust an account holder's balance. Data protection controls may limit access to data depending on time of day, how frequently a user has accessed the data, and so on.

The data transport system 104 may include an extractor 142 and an authorization projector 144. In an embodiment, the data transport system 104 may be part of an Extraction, Translation, Load (ETL) utility. The extractor 142 may be configured to communicate with the source system 102 and the target system 106 to transport data from one system to the other. In a particular embodiment, for example, the extractor 142 may be a data extraction tool generally referred to as a business information warehouse (BW) extractor.

In embodiments, the data protection controls 126 and 166 may be different in terms of specific tools, procedures, policies, etc, implemented by respective systems 102 and 106. Accordingly, the authorization projector 144 may provide a mapping between the data protection controls 126 of the source system 102 and the data protection controls 166 of the target system 106. In particular, data protection controls applied by the source system 102 to data exported from the source system may be mapped to corresponding access controls in the target system 106 when that data is imported to the target system. In embodiments, the authorization projector 144 may include an object analysis module 152, an authorization projection module 154, an implementation module 156, and a test and validation module 158.

The object analysis module 152 enables the data protection controls that are associated with the data received from source system 102 to be determined at the data object level. For example, the data may be represented in the source system 102 as records in a relational database, as business objects organized in a hierarchical structure, and so on. In embodiments, the object analysis module 152 may identify the set of data protection controls applied to a given set of data received from the source system 102 to enable determining user access based on the data object, functionality (e.g., modify the data object, delete the data object, etc), and so on.

The authorization projection module 154 provides mapping of the data protection controls 166 of the target system 106 to the object-level data protection controls obtained in the object analysis module 152. This module identifies data protection controls provided by the target system 106 that are to be applied to data received from source system 102 to ensure that users in the target system have the same level of data access to the received data as users in the source system.

The implementation module 156 implements the data protection controls identified by the authorization projection module 154. Validation of the data protection controls implemented for the data that is imported into the target system 106 may be performed by the test and validation module 158.

Figure 2:
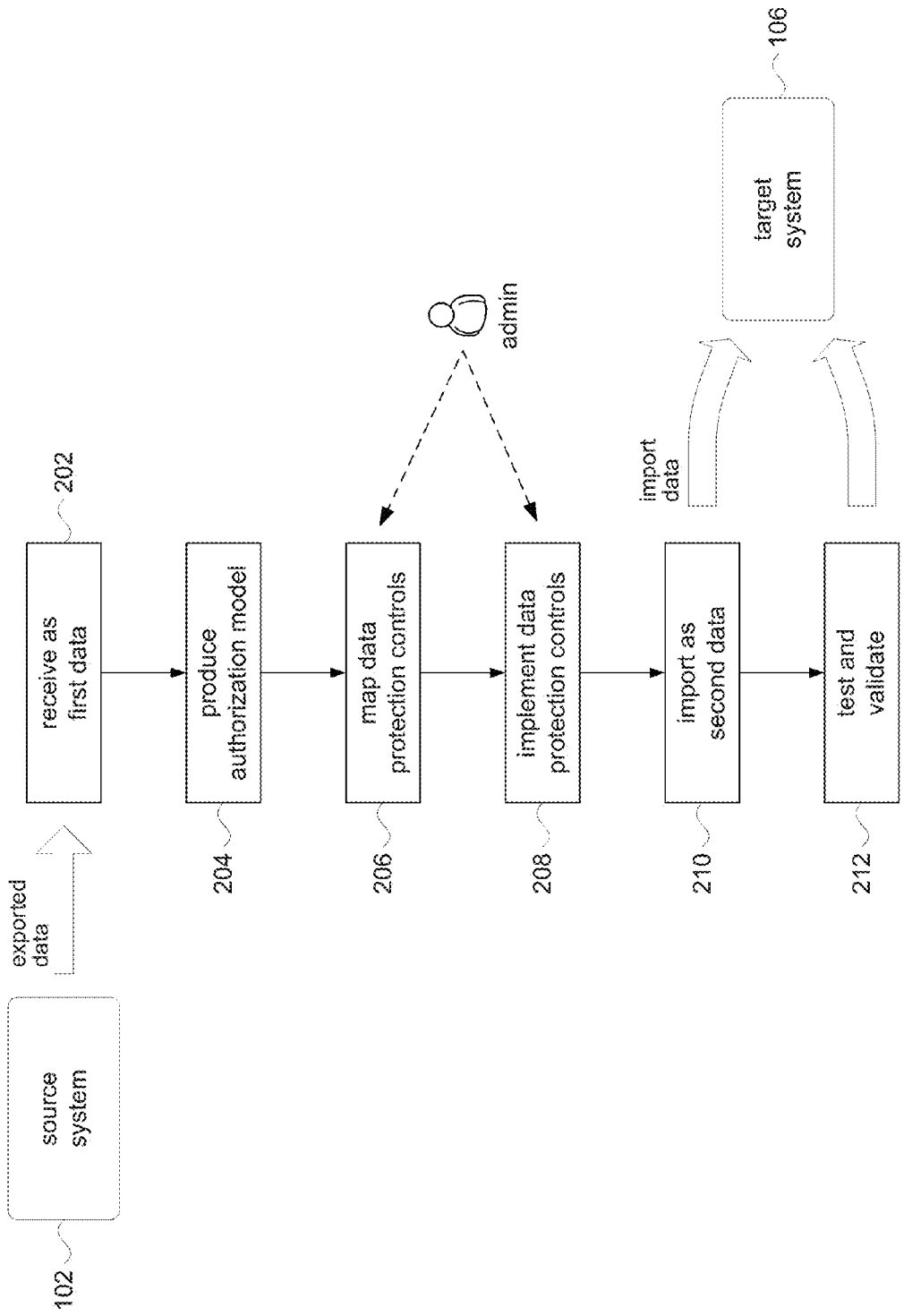
FIG. 2 is a generalized flow chart for exporting and importing data in accordance with the present disclosure.

Referring now to FIG. 2, processing performed by the authorization projector 144 in accordance with the present disclosure will now be discussed. At a step 202, the authorization projector 144 may receive data from the source system 102, as first data. For example, the extractor 142 may export data from the source system 102 and feed the exported data to the authorization projector 144. In embodiments, the exported data may include information pertaining to the data protection controls associated with the exported data and provide that information to the authorization projector 144.

Figure 3:
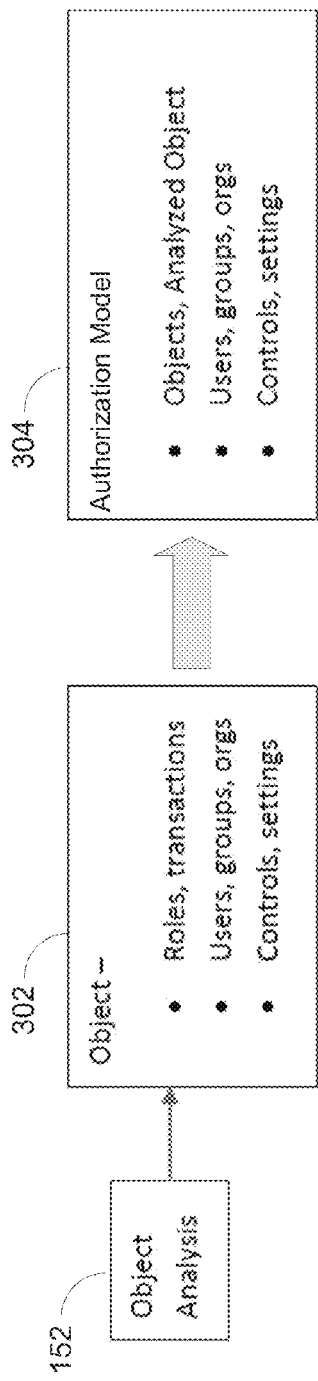
FIG. 3 illustrates generating an authorization model.

In a step 204, an authorization model is developed which represents the data protection controls that are applied to the exported data. In a business system embodiment, for example, business applications typically support complex authorization scenarios to ensure adequate yet secured access to business application data. Accordingly, in embodiments, the object analysis module 152 may analyze the data protection controls applied to the exported data to develop the authorization model. Referring to FIG. 3, the object analysis module 152 determines for each data object information 302 including:

- users' roles (e.g., manager, project leader, etc.) and functions (e.g., sales management, quality control, etc.) within the enterprise and transactions (e.g., add data, modify data, etc.) on the data that necessitate their access to various elements (e.g., objects) of the exported data,
- configuration and settings of the application that support conditional access, including specific conditions applicable to specific elements of the exported data,
- dialog users, system users, groups, organizations, and other collections of users within the enterprise that have access to the exported data,
- data protection controls to ensure that transformed data have the same levels of data security and access as the exported data from which the transformed data are derived; for example, analytical data should have a level of data security and access commensurate with the security and access that is applied to the exported data used in the analysis.

The result is an authorization model 304 that represents the data protection controls of the exported data as provided by the source system 102.

In a step 206, data protection controls from the source system 102 that are applied to the exported data are mapped to data protection controls provided in the target system 106. For each data object, an automated mapping functionality may use the authorization model 304 produced in step 204 to determine the appropriate data protection controls of the target system 106 to achieve the same level of data security and access as provided in the source system 102. The data protection controls in the source system 102 may support different capabilities than are provided in the target system 106. Accordingly, there may be data protection controls in the source system 102 that are not supported in the target system 106. In embodiments, the mapping performed in step 206 ensures that the level of data access and security provided to the exported data in the target system 106 is at least as secure as in the source system 102. Where the same level of data access and security cannot be mapped into the target system 106, then the mapping may produce a higher level of data security and access in the target system. In some embodiments, the mapping step 206 may include receiving input from a user (e.g., system administrator) to resolve situations that cannot be resolved by automation.

Figure 4:
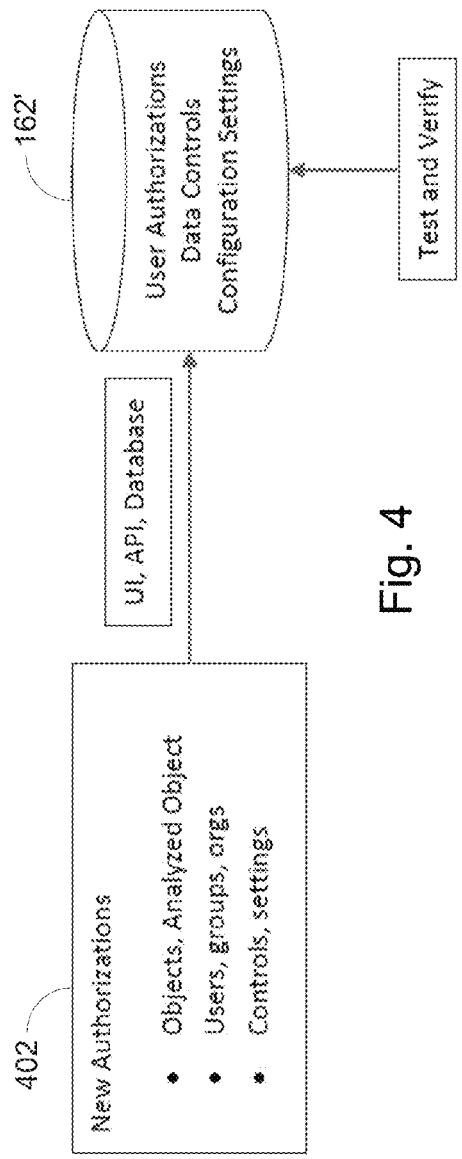
FIG. 4 illustrates implementing new authorizations.

In a step 208, and with reference to FIG. 4, new authorizations 402 produced from the authorization model 304 in the mapping step 206 may be applied to the exported data as it is imported as imported data 162' (step 210) into the target system 106. In some embodiments, data that is computed or otherwise transformed from the exported data may be protected based on the data protection controls (as determined, for example, from the authorization model 304) associated with the exported data that was used to perform the computation or transformation. FIG. 4 shows that the implementation step 208 may include API's to access functionality for implementing security measures, the use of databases (DBs) for accessing configuration data and other settings, and so on. In some embodiments, the implementation step 208 may include receiving input from a user (e.g., system administrator) to resolve situations that cannot be resolved by automation.

In a step 212, the imported data is tested and validated. In particular, the applied data protection controls of the imported data may be tested. In some embodiments, the test may be informed by the object-level data protection controls identified in step 204 to produce specific test vectors for the imported data. The test and validation module 158 may create a differential report by data object to verify that users have the same access and restrictions to the imported data in the target system 106 as required by the corresponding data in the source system 102.

Figure 5:
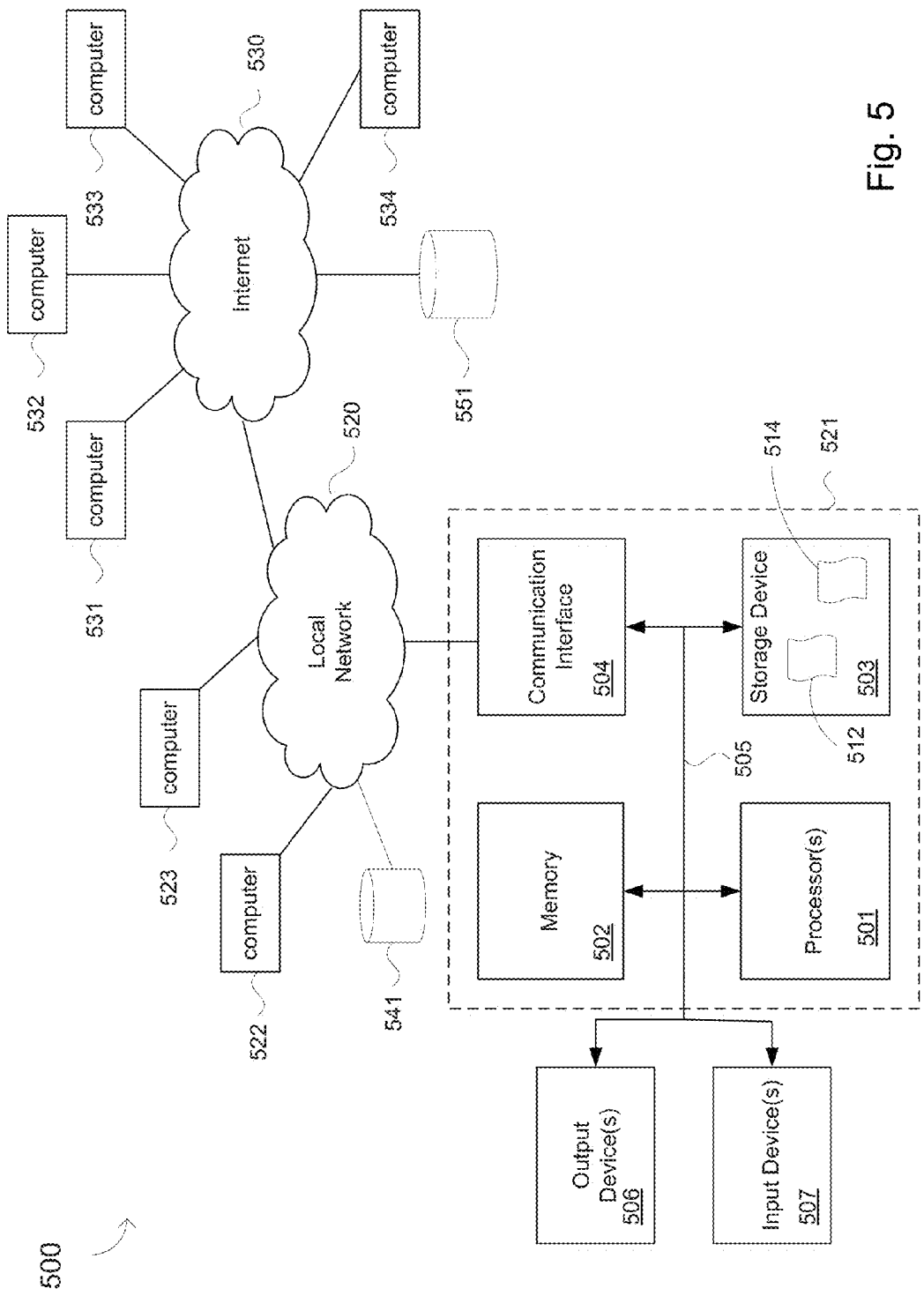
FIG. 5 is a high level system block diagram in accordance with disclosed embodiments.

FIG. 5 is a block diagram of a system 500 according to some embodiments. The system 500 includes computers 521-523 and one or more storage systems 541 interconnected by a local network 520 such as a Local Area Network (LAN), a Wide Area Network (WAN), and the like. In some embodiments, the system 500 may include computers 531-534 and one or more storage systems 551 connected to the Internet 530. The local network 520 may be connected to the Internet 530.

Each computer (e.g., computer 521) may be configured as a general purpose computing apparatus and may execute program code to perform any of the functions described herein. Source system 102, data transport system 104, and target system 106 each may comprise a computer system configured like computer 521, for example.

Each computer (e.g., computer 521) includes, among its components, a processor component 501 (comprising one or more processing units) operatively coupled to a communication interface 504, a data storage device 503, one or more input devices 507, one or more output devices 506, and a memory 502. The communication interface 504 may facilitate communication on the local network to access other systems, such as storage system 541 for example.

Input device(s) 507 may include, for example, a keyboard, a keypad, a mouse or other pointing device, a microphone, knob or a switch, an Infra-Red (IR) port, a docking station, a touch screen, and so on. Input device(s) 507 may be used, for example, to enter information into the computer. Output device(s) 506 may include, for example, a display (e.g., a display screen), a speaker, a printer, and so on. Additional elements (not shown) may be including according to some embodiments.

The data storage device 503 may comprise any appropriate persistent storage device, including combinations of magnetic storage devices (e.g., magnetic tape, hard disk drives and flash memory), optical storage devices, Read Only Memory (ROM) devices, etc., while memory 502 may comprise Random Access Memory (RAM).

The data storage device 503 may store program code 512 which may be executed by the processor component 501 to cause the computer to perform any one or more of the processes and methods described herein. For example, the program code 512 may be configured to cause processor 501 to perform the steps shown in FIG. 2. Embodiments are not limited to execution of these processes by a single apparatus.

The data storage device 503 may store data structures 514 such as object instance data, runtime objects, and any other data described herein. The data storage device 503 may also store data and other program code for providing additional functionality and/or which are necessary for operation thereof, such as device drivers, operating system files, etc.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

Advantages and Technical Effect

Many key technology solutions for large enterprises (e.g., manufacturing, hospital services, government agencies, etc.) typically involve the extraction of enterprise data into new channels and analytics applications. However, the need to ensure that existing data security and compliance requirements are maintained in the extracted enterprise data limit the deployment of new systems. Embodiments in accordance with principles of the present disclosure map authorizations and controls, and provide test and validation to ensure that extracted enterprise data remain secure and accessible only by authorized users. For example, disclosed embodiments:

Accelerate deployment of new infrastructure, and delivery channels for applications that leverage enterprise data.

Maintain existing data security and controls with intelligent mapping for enterprise data and analytics based on enterprise data.

Automate process of authorization mapping from business applications to new business intelligence and reporting applications.

Support audit reporting and test vectors to validate security and controls.

What is claimed is:

1. A method in a computer system to preserve data authorizations for imported data comprising operating the computer system to perform steps of:
receiving first data from a first system having first data protection controls to provide data security for and control access to first data stored on the first system;
producing an authorization model representative of a configuration of the first data protection controls that is used to secure and access the first data; and
causing the first data to be imported from the first system and exported onto a second system, without changing the first data, the second system having second data protection controls, different from the first data protection controls, and
enabling data security for and control access to the first data stored on the second system without changing the first data by:
using the authorization model to transform the configuration of the first data protection controls into a configuration of the second data protection controls; and
applying the configuration of the second data protection controls to the first data, thereby projecting the authorization model associated with the first data stored on the first system to the first data stored on the second system without changing the first data.

2. The method of claim 1 further comprising transforming some of the first data to produce transformed data and associating first data protection controls to the transformed data based on first data protection controls associated with the transformed first data.

3. The method of claim 1 further comprising generating test vectors to test second data protection controls applied to the second data.

4. The method of claim 1 wherein the first data comprises a structured arrangement of data elements, wherein the authorization model is representative of first data protection controls associated with each of the data elements.

5. The method of claim 1 wherein the authorization model represents data protection controls based on roles of users who can access the first data.

6. The method of claim 1 wherein the authorization model represents users, groups, and organizations that can access the first data.

7. The method of claim 1 wherein the authorization model represents functions to be performed on the first data.

8. A computer system comprising:
a computer device; and
data storage having stored thereon computer executable program instructions which, when executed by the computer device, cause the computer device to:
receive first data from a first system having first data protection controls to provide data security for and control access to first data stored on the first system;
produce an authorization model representative of a configuration of the first data protection controls that is used to secure and access the first data; and
cause the first data to be imported from the first system and exported onto a second system, without changing the first data, the second system having second data protection controls, different from the first data protection controls, and
enable data security for and control access to the first data stored on the second system without changing the first data by:
using the authorization model to transform the configuration of the first data protection controls into a configuration of the second data protection controls; and
applying the configuration of the second data protection controls to the first data, thereby projecting the authorization model associated with the first data stored on the first system to the first data stored on the second system without changing the first data.

9. The computer system of claim 8 wherein the computer executable program instructions which, when executed by the computer device, further cause the computer device to transform some of the first data to produce transformed data and associate first data protection controls to the transformed data based on first data protection controls associated with the transformed first data.

10. The computer system of claim 8 wherein the computer executable program instructions which, when executed by the computer device, further cause the computer device to generate test vectors to test second data protection controls applied to the second data.

11. The computer system of claim 8 wherein the first data comprises a structured arrangement of data elements, wherein the authorization model is representative of first data protection controls associated with each of the data elements.

12. The computer system of claim 8 wherein the authorization model represents data protection controls based on roles of users who can access the first data.

13. The computer system of claim 8 wherein the authorization model represents users, groups, and organizations that can access the first data.

14. The computer system of claim 8 wherein the authorization model represents functions to be performed on the first data.

15. A non-transitory computer readable storage medium having stored thereon computer executable program code configured to cause a computer system to perform steps of:
receiving first data from a first system having first data protection controls to provide data security for and control access to first data stored on the first system;
producing an authorization model representative of a configuration of the first data protection controls that is used to secure and access the first data; and
causing the first data to be imported from the first system and exported onto a second system, without changing the first data, the second system having second data protection controls, different from the first data protection controls, and
enabling data security for and control access to the first data stored on the second system without changing the first data by:
using the authorization model to transform the configuration of the first data protection controls into a configuration of the second data protection controls; and
applying the configuration of the second data protection controls to the first data, thereby projecting the authorization model associated with the first data stored on the first system to the first data stored on the second system without changing the first data.

16. The non-transitory computer readable storage medium of claim 15 wherein the computer executable program code is further configured to cause the computer system to transform some of the first data to produce transformed data and associate first data protection controls to the transformed data based on first data protection controls associated with the transformed first data.

17. The non-transitory computer readable storage medium of claim 15 wherein the computer executable program code is further configured to cause the computer system to generate test vectors to test second data protection controls applied to the second data.

18. The non-transitory computer readable storage medium of claim 15 wherein the first data comprises a structured arrangement of data elements, wherein the authorization model is representative of first data protection controls associated with each of the data elements.

19. The non-transitory computer readable storage medium of claim 15 wherein the authorization model represents data protection controls based on roles of users who can access the first data.

20. The method of claim 1 wherein the first data protection controls comprises access permissions that identify who can add data to the first data and who can modify the first data and constraints on when the first data can be accessed, wherein the authorization model is further representative of constraints on when the first data can be accessed.

* * * * *